US007634156B2

(12) United States Patent
Ciccarelli

(10) Patent No.: US 7,634,156 B2
(45) Date of Patent: Dec. 15, 2009

(54) SYSTEM AND METHOD FOR RAPID EMERGENCY INFORMATION DISTRIBUTION

(75) Inventor: Victor Ciccarelli, Santee, CA (US)

(73) Assignee: Archaio, LLC, New York, NY (US)

( * ) Notice: Subject to any disclaimer, the term of this patent is extended or adjusted under 35 U.S.C. 154(b) by 411 days.

(21) Appl. No.: 11/068,268

(22) Filed: Feb. 28, 2005

(65) Prior Publication Data

US 2005/0213155 A1 Sep. 29, 2005

Related U.S. Application Data

(63) Continuation-in-part of application No. 10/629,347, filed on Jul. 28, 2003.

(60) Provisional application No. 60/398,927, filed on Jul. 27, 2002, provisional application No. 60/547,790, filed on Feb. 27, 2004.

(51) Int. Cl.
*G06K 9/32* (2006.01)
*G06K 9/36* (2006.01)
*G06K 9/60* (2006.01)
*G06K 15/00* (2006.01)
*G09G 5/00* (2006.01)

(52) U.S. Cl. ....................... 382/298; 382/276; 382/305; 358/1.18; 345/660

(58) Field of Classification Search ................. 382/298; 358/1.18
See application file for complete search history.

(56) References Cited

U.S. PATENT DOCUMENTS

| | | | | |
|---|---|---|---|---|
| 4,193,087 | A * | 3/1980 | Altman | 358/479 |
| 4,661,811 | A * | 4/1987 | Gray et al. | 345/636 |
| 5,448,696 | A * | 9/1995 | Shimada et al. | 715/853 |
| 6,134,338 | A * | 10/2000 | Solberg et al. | 382/113 |
| 6,321,158 | B1 * | 11/2001 | DeLorme et al. | 701/201 |
| 6,529,137 | B1 * | 3/2003 | Roe | 340/691.1 |
| 6,766,331 | B2 * | 7/2004 | Shema et al. | 707/102 |
| 6,829,584 | B2 * | 12/2004 | Loveland | 705/7 |
| 6,941,000 | B2 * | 9/2005 | Wong | 382/113 |
| 7,134,088 | B2 * | 11/2006 | Larsen | 715/765 |
| 7,356,406 | B2 | 4/2008 | Harrison et al. | |
| 2002/0077787 | A1 | 6/2002 | Rappaport et al. | |
| 2003/0125998 | A1 | 7/2003 | McKenney et al. | |
| 2003/0234725 | A1 | 12/2003 | Lemelson et al. | |
| 2003/0234731 | A1 | 12/2003 | Rhodes et al. | |
| 2005/0104969 | A1 | 5/2005 | Schoelkopf et al. | |

* cited by examiner

*Primary Examiner*—Brian P Werner
*Assistant Examiner*—Jose M Torres
(74) *Attorney, Agent, or Firm*—Keith D. Nowak, Esq.; Carter Ledyard & Milburn LLP

(57) ABSTRACT

A building's scaled plans are integrated in a single system. The structural, electrical, water, fire alarm, motion detection, and other various assorted systems are all integrated into the same system. Thus, they are easily accessible to emergency personnel. The emergency personnel will have immediate access to data gathered by the alarm system thereby notifying emergency personnel immediately of the location of hazardous situations as well as where potential victims or, in the event of a crime where, perpetrators may be. The system can also be used to plan ingress and egress routes or point-to-point routes and distances. Further, emergency planning for other structures such as bridges and tunnels can be performed using the disclosed system. Additionally, GPS locators can be used to track personnel.

15 Claims, 3 Drawing Sheets

SYSTEM AND METHOD FOR RAPID EMERGENCY INFORMATION DISTRIBUTION

The present invention is a continuation-in-part of U.S. patent application Ser. No. 10/629,347, filed Jul. 28, 2003, which claims the benefit of U.S. Provisional Patent Application Ser. No. 60/398,927, filed Jul. 27, 2002, titled "Systems and Methods for Viewing and Modifying Digitized Drawings," and U.S. Provisional Patent Application Ser. No. 60/547,790, filed Feb. 27, 2004, the contents of each of which are hereby incorporated by reference as if set fully herein.

BACKGROUND OF THE INVENTION

It is known that buildings can be provided with various alarm systems. U.S. patent application Ser. No. 10/434,390 discloses a method of displaying event information from a building system where the event is a non-normal condition generated within a building system. Information regarding the building is displayed on a display portion. The displayed information is selectable and changeable by a user. An alarm graphic can also be displayed which relates to a non-normal condition in a building. A user may elect to show a floor plan, which discloses the status of fire system alarm generating devices. However, while this graphic may be displayed, the user is unaware of the spatial relationships that exist between users in the building and the building's structural characteristics.

A responder assets management system (RAMS) is disclosed in U.S. patent application Ser. No. 10/038,572. The disclosed system utilizes information available to responders including emergency response personnel including local weather, national weather, and links to other information. The system also provides virtual walkthrough capability of a building or facility. However, while providing this virtual walkthrough, there is no ability for the user to scale and zoom to determine exact spatial relationships.

Finally, U.S. patent application Ser. No. 10/177,577 discloses a system and method for detecting monitoring and evaluating hazardous situations in a structure. Sensors having two-way communication capability are strategically located in a structure or in a matrix of structures. These units are high-level multi-functional detectors that communicate with a base computer. However, as with the other systems discussed above, there is no spatial relationship provided for users so that they can determine their exact relationship within a structure.

SUMMARY OF THE INVENTION

In these changing times, it is imperative that in emergencies fire departments, police departments, security personnel and other emergency management personnel have access to a building's plan to better protect the occupants. More importantly, the building plans are worthless to these personnel if the plans are not to scale. What is needed is a system and method that gives emergency personnel the building architectural plans to scale, so that they are useful to the emergency personnel. The system and method can be embodied in a software package.

The scale plans are useful to emergency personnel for planning ingress egress routes for buildings or structures, including stadiums, arenas, bridges, tunnels, and the like. Additionally, point-to-point routing is easily determined.

The scale plans are useful to the public and emergency personnel for planning ingress and egress routes both before and during an emergency. To prepare for possible emergencies, building tenants or management can use the disclosed system to determine pre-arranged routes for entering and exiting the building. When an emergency occurs, emergency personnel can use the invention's dynamic searching and delivery capabilities to determine, in real time, the routes to emergency exits. The system also allows emergency personnel to determine all routes in and out of a specific area, and access or block specific portions of the building.

The current invention facilitates point-to-point routing within a structure, allowing personnel to identify exact routes for reaching a specific location. Emergency personnel will know how to get from point A to point B, and the exact distance they must travel. For example, when a building is engulfed in smoke, fire personnel cannot see and must rely on other means to assess where they need to go. Utilizing this system, firefighters will know exactly how far to go in any given direction to reach a location. Similarly, in stadiums and arenas, security can utilize the disclosed system to pinpoint problem areas and address security situations that may arise. Both emergency personnel and tenants or other people in the building will be able to determine the location of emergency exits and routes to the exits. Various routes to emergency exits can be determined in real time using dynamic searching.

The invention can deliver the scale plan information in at least three ways. First, in one embodiment, the invention displays the information on a PC screen and allows users to pick selected points or areas using a pointing device, such as a mouse. Second, the invention can display the information on hand-held devices that personnel can carry. Third, the system can use a heads-up display, which displays the relevant information in a user's line of sight. Using the invention in this manner would aid firefighters who often work in situations involving reduced visibility. With the invention, a firefighter walking in darkness can view a heads-up display that details any needed information, including current location and routes to a desired destination.

Finally, three-dimensional scale displays can be used so that a planning board or planning personnel can determine access routes as well as containment strategies or other strategies. Utilizing the disclosed system, pre-arranged routes can be developed by building tenants or building management to determine ingress and egress routes. Further, for stadiums, arenas, and the like, security can utilize the disclosed system to pinpoint problem areas and determine solutions to various security situations that may arise.

Users can implement the invention in at least three ways: (1) kiosks, (2) remote communication systems, and (3) an integrated system.

BRIEF DESCRIPTION OF THE SEVERAL VIEWS OF THE DRAWING(S)

Having thus described the invention in general terms, reference will now be made to the accompanying drawings, which are not necessarily drawn to scale.

DETAILED DESCRIPTION OF THE INVENTION

Figure 1:
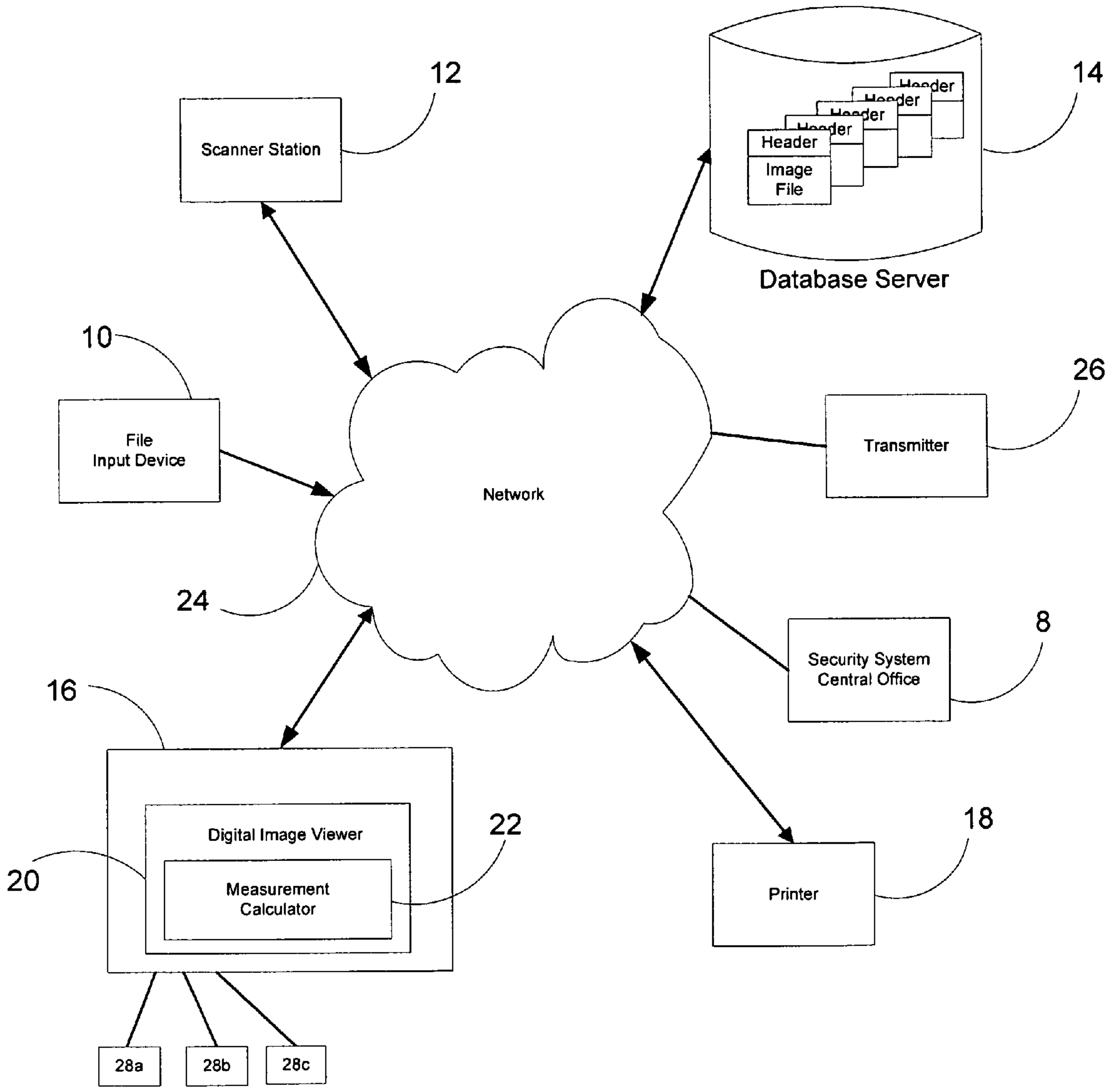
FIG. 1 is a schematic block diagram illustrating a system in accordance with an embodiment with the present invention.

The system allows for an operator in a first location to provide information to a user at a second location. For example, once again using the example of the firefighters above, the firefighters can have a heads-up display, for example on a visor of the firefighter's protective gear, with the image of the building floor plan on his heads-up display. While supervisor on the street or at a central control location can then provide travel directions to the firemen via the heads up display, by oral instructions, or the like.

Another embodiment integrates all of a building's scaled plans into one system. Thus, structural, electrical, water, fire alarm, motion detection, and other critical systems are all easily accessible to emergency personnel. The emergency personnel will have immediate access to data gathered by the alarm system, which can identify the location of hazardous situations, potential victims, or criminal perpetrators.

The system could use standard RF communication, optic links, Bluetooth, IR links, or the like. Further, the three dimensional model can be integrated with other building systems such as the intrusion alarm, fire alarm or smoke alarm system so that various obstructions that may be present i.e., fire alarms are taken into consideration when determining egress routes.

Further, emergency planning for other structures such as bridges and tunnels can be performed using the disclosed system. Additionally, GPS locators can be used to track personnel location. In another embodiment, RF triangulation is used to determine exact personnel location. RF triangulation is performed using antennas installed in a building or, for older buildings or buildings without such antennas, portable triangulation units are used.

In another embodiment, the triangulation equipment is in emergency response vehicles. RF triangulation can be used in conjunction with GPS locators so that the triangulation points are known using GPS technology and the exact location is determined by interpolation using triangulation.

The system uses existing electronic cad drawings or paper plans. The plans are entered into the system and stored in one or more servers. The system, using a raster to vector conversion, prepares the paper or legacy plans for use. The prepared plans are to scale. Once entered into the system, the plans are immediately accessible to all users, including remote users. In one embodiment, the plans are password protected.

The system can also be used for planning, decorating, and design. Once the plans are entered and scaled, other objects can be added to the plans such as furniture, rugs, and paintings. The system includes a walk-through feature so that the final layout can be viewed. Detailed measurements can be made using the disclosed system because the drawings are to scale.

In one embodiment of the system, kiosks are available in and around a structure that will allow users to select a start and end points. The system then generates a three-dimensional depiction or two-dimensional map to scale to display the route. The produced image will be to scale so that the user will easily be able to determine distances.

With reference to FIG. 1, a preferred embodiment of the present invention comprises a scanner station 12, a database 14, a workstation 16, a printer 18, a file input device 10, a transmitter 26, and a security system central office 8. The scanner station 12 includes a scanner and associated software required to capture a digital image of a paper document, such as a building blueprint, floor plan, riser diagram or other architectural or design drawing. In a preferred embodiment, the scanner station 12 comprises a high speed, large format scanner connected to a desktop computer of sufficient speed and RAM to process large digital images. The database server 14 comprises any suitable database for storing the image file created by the scanner and its associated software. In another embodiment, the image files are input into the database as digital files, e.g., cad files and the like. The database stores entire floor plans and structural details for a complete facility, making the data immediately accessible. Thus, emergency crews are fully aware of the entire building layout and any potential trouble spots well in advance of entering the structure.

The workstation 16 may be any suitable computing device with user interface means such as a monitor, keyboard, mouse, stylus, etc. The workstation may be a desktop computer or a portable computing device, such as laptop 28*a*, PDA 28*b* or cell phone 28*c*. The workstation includes a viewer 20. An aspect of the viewer 20 is the inclusion of a measurement calculator 22, in accordance with the present invention, for calculating the true scale measurement of lines and shapes drawing with the viewer 20.

The printer 18 is any suitable printer capable of printing from the workstation 16, and a network 24 interconnects the aforementioned devices. The network 24 may comprise any telecommunication and/or data network, whether public or private, such as a local area network, a wide area network, an intranet, an internet and/or any combination thereof and may be wired and/or wireless. Due to network connectivity, various methodologies as described herein may be practiced in the context of distributed computing environments.

In one embodiment of the invention, the workstation 16 has one or more docking stations associated with it. These docking stations are used to download the floor plans and structural details to a device such as a tablet PC, PDA, cell phone, and the like. Thus, in addition to being able to having a printout of the data, an electronic copy can be used. In another embodiment, the data is transmitted to a PDA, cell phone, or the like utilizing transmitter 26. In one embodiment, data is transmitted to a heads-up display using Bluetooth technology, or the like.

In practice, the transmission of the data files to the cell phone, PDA or the like is done utilizing existing cell phone and pager infrastructure. In yet another embodiment, the data can be transmitted on standard FM signals.

Figure 2:
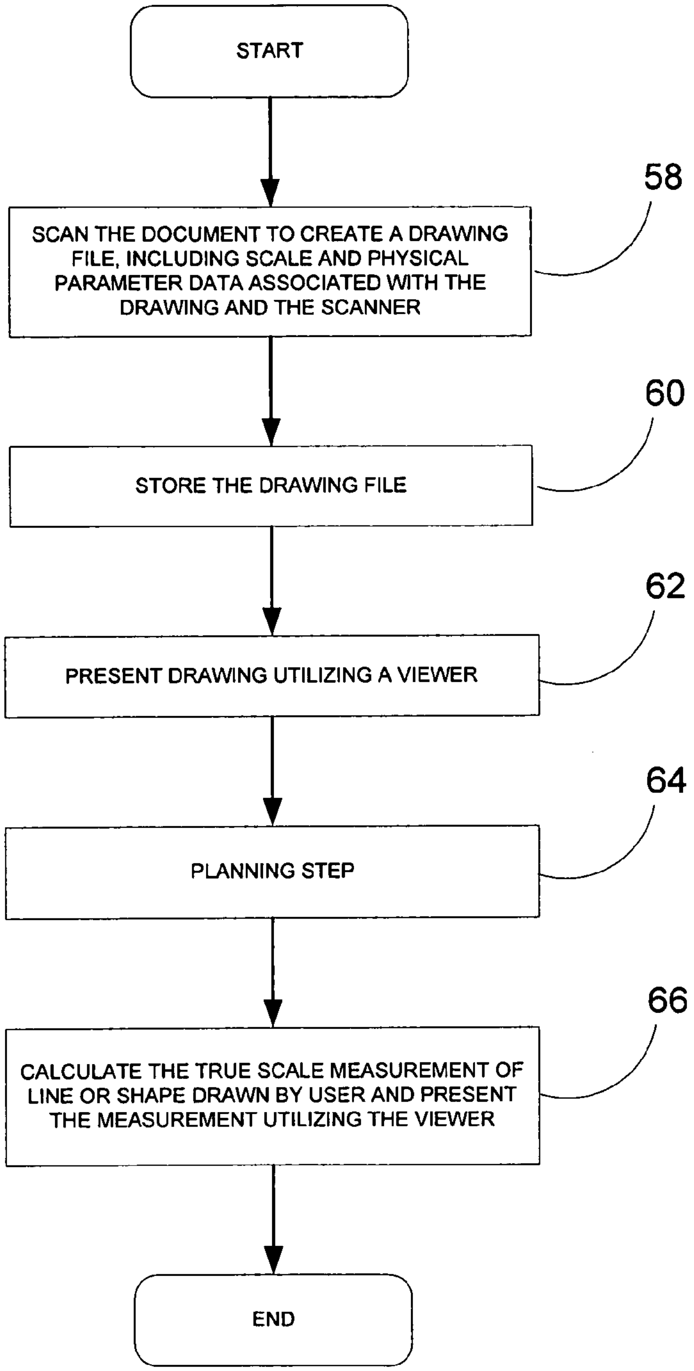
FIG. 2 is a flowchart of an embodiment of the present invention.

With reference to FIG. 2, a method in accordance with the present invention is shown. As an initial step, a paper document is digitized, as indicated by block 58. This step includes scanning the paper document using the scanner station 12 to create a bitmapped image or using an input device to load a digital file. In the illustrated embodiment, the paper document is a drawing. The scale data and physical parameters of the paper drawing being scanned are captured and associated with the bitmapped image. Specifically, the original scale information of the paper drawing, the DPI of the scan, and the original size of the paper are recorded and associated with the digital image. In another embodiment, the input is from file input device 10, which inputs a digital file.

It should be noted that the information recorded and associated with the digital image file does not necessarily have to be recorded at the time the image is scanned or otherwise acquired. Also, additional information identifying the paper document may also be recorded, such as the building name, building owner, date of drawing, etc.

Once the digital image file has been created, it may be stored, as indicated by block 60, in the database sever 14. However, the digital image file may be stored in the memory of virtually any computing device, including at the scanning station 12, workstation 16, or a cell phone, PDA, or the like. In a preferred embodiment, the plurality of digital image files are stored together at a central data repository.

A user, as indicated by block 62, may then view the digital image preferably at a workstation 16. The digital image file is sent to the workstation via the network 24. The digital image viewer 20, can be utilized to open and view the digital image. The digital viewer application should at a minimum, have some drawing tools, with at least the ability to draw lines and to interconnect those lines to form a shape.

Additionally, the user will view the file in an emergency situation. For example, if firefighters are dispatched to a burning structure, the firefighters download the digital files to a PDA or the like so that they have the entire structural layout of the building. In one embodiment, a first user at a workstation provides routing or other information to a second user in a structure. The second user receives this information on a PDA, cell phone, tablet computer, heads-up display, or the like.

The user then utilizes the viewer to plan ingress and egress routes or calculate distances as indicated by block 64. Thus, the digital image viewer 20 is modified to access the scale and physical parameter information associated with the digital image and calculate the true scale measurement of a line or area of a shape.

At block 64, the user can trace a path or route in a building. The length of distance of this route will then be calculated and presented to the user in block 66. In one embodiment, the user views the drawing on a PDA, or the like. The blueprint presented on the PDA provides the user (emergency response personnel) with accurate measurements of floor space and distances between entrances, exits and target locations. Additionally, the system provides full scaling functionality. This scaling functionality allows a user to zoom in and out of a specific area to provide as much or as little detail as required. In one embodiment, to zoom a user uses a zoom tool to select the area that should be zoomed. Alternately, the system will zoom in preset increments, i.e., 10%, 20% 30% around a specific area merely by tapping a stylus in the desired zoom area. It should be noted that no matter how much a user magnifies the display, it remains accurately scaled.

Along with measurements, the system can provide other structural elements such as stairwells, elevators, entrances, exits, shaft ways, and the like. Further, the location of sprinklers, fire extinguishers, hose hook-ups, and electrical access panels can also be provided on the layout. In yet another embodiment, hazardous materials can also be displayed.

In one embodiment of the invention, a building security system is tied into the network. The security system can provide such data as active alarms such as fire alarms, smoke alarms, carbon monoxide alarms, smoke alarms, and the like. Additionally, a building's motion sensors can be tied into the network such that people in the building can be tracked, thereby enabling rescue attempts. Alternatively, if a hostage situation exists, police can use this data to plan a rescue mission.

Figure 3:
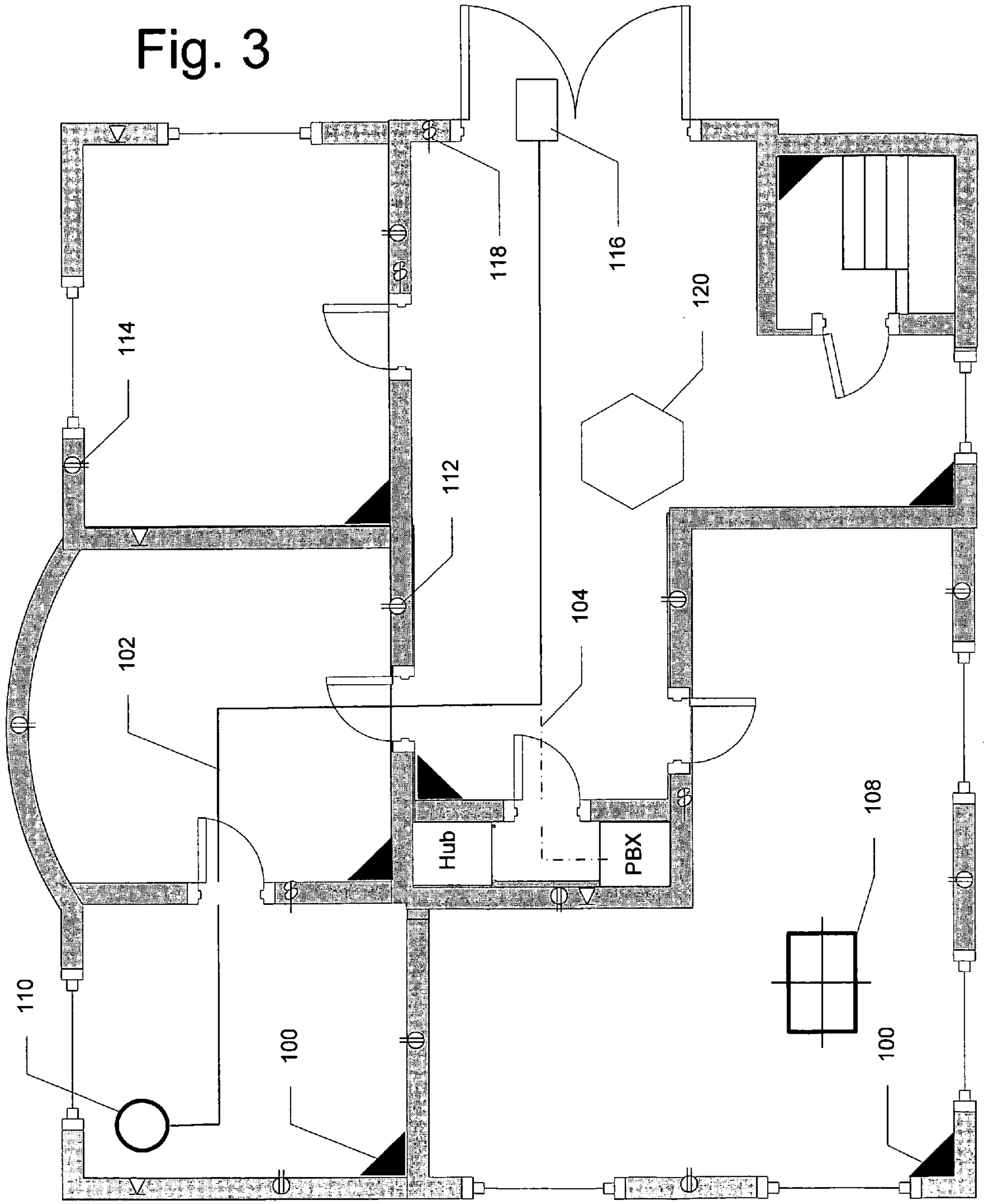
FIG. 3 is an illustration of a data display, in accordance with an embodiment of the present invention.

FIG. 3 is an illustration of a data display, in accordance with an embodiment of the present invention. As shown, the display is zoomed in to so the user can discern a desired level of detail. In a preferred embodiment, a cursor is used to select a start point such as entryway 116 and end point 110. The system calculates a route from 116 to 110. Two routes are shown in FIG. 3. A first route, 102, is shown from the entryway 116 to a point 110 in a back office. A second route 104 is shown from the entry point 116 to a utility closet housing a PBX and Hub. Tn one embodiment, items such as outlets 114, switches 118, and telephone jacks 112 are shown. Other items such as electrical conduits, HVAC systems, and plumbing are shown.

In one embodiment, the buildings security system is tied into the display. The display provides data from motion sensors 100, heat and smoke alarms, and door and window sensors. In this manner, emergency workers can determine problem areas and potential rescue situations. In one embodiment, GPS locators can be used to track people and equipment.

In one embodiment, a kiosk 120 is present. Building visitors use the kiosk 120 as a guide. In one embodiment, patrons use the kiosk as a directory. Patrons either selects a destination graphically, e.g., a desired office 110, or selects from a directory listing. Either way, a route is displayed.

Users use zoom tool 108 a user zooms in and out of a specific area to provide as much or as little detail as required. In one embodiment, to zoom, zoom tool 108 selects the specific area to be magnified. Alternately, the system will magnify in preset increments, i.e., 5%, 10%, 15%, etc. using the selected area as the center of the area to be magnified. In another embodiment, the preset increments are selectable by the user. It should be noted that accurate scaling is maintained at each magnification point.

As described above, the system and method according to the present invention provides the ability to take paper based original drawings and provide scaled digitized images that allow for accurate point to point measurement and routing. The foregoing embodiments are given by way of example for the purpose of teaching the method and system of the present invention. The present invention is not limited to these embodiments and one skilled in the art may affect various changes and modification within the spirit of the invention as defined in the appended claims.

I claim:

1. A method for providing information of a digital raster image, comprising:

digitizing a paper document to create a digital raster image;

recording DPI of the digital raster image, original size of the paper document and scale information associated with the paper document and a digitizing device;

embedding the DPI, the original size and the scale information in a header of the digital raster image;

storing the digital raster image as a single file, wherein said single file has the DPI, the original size and the scale information embedded in the header of said digital raster image;

providing a digital image viewer for, rendering the digital raster image, and providing zooming means to magnify the rendered digital raster image, whereby said scale information of the magnified digital raster image is maintained.

2. The method of claim 1, wherein the zooming is performed in predetermined steps.

3. The method of claim 2, wherein the predetermined steps are set by a user.

4. The method of claim 1, wherein the digital raster image is transmitted to a user.

5. The method of claim 1, further comprising: receiving a first point identifier, said first point identifier representing a first location in the digital raster image; receiving a second point identifier, said second point identifier representing a second location in the digital raster image; planning a route from said first location to the second location; and displaying the route a part of the digital raster image.

6. The method of claim 5, further comprising: calculating a distance of the route; and displaying the calculated distance.

7. A system for presenting information of a digital raster image, comprising:

a digitizing device that digitizes a paper document to create a digital raster image, wherein DPI of the digital raster image, original size of the paper document and scale information associated with the paper document is recorded and embedded in a header of the digital raster image;

a digital image viewer that receives the digital raster image and:

renders the digital raster image to scale and receives input from a user comprising a start and end point within a structure, said structure includes a building, a stadium, an arena, a bridge and a tunnel, said start and end points are not prescribed; and a processor that calculates a true scale measurement of a route from the start point to the end within said structure, wherein the route is presented to the user, wherein said DPI, said original size and said scale information is used by said processor to calculate said true scale measurement.

8. The system of claim 7, further comprising: a zooming apparatus, the zooming apparatus magnifying the digital raster image, while maintaining the scale information of the magnified digital image.

9. The system of claim 8, wherein the magnification is performed in predetermined steps.

10. The system of claim 9, wherein the predetermined steps are set by a user.

11. A digital image viewer for presenting information based on a digital raster image of a paper drawing, comprising:

a route calculator that calculates a route between a first and second location within a structure, said structure includes a building, a stadium, an arena, a bridge and a tunnel, the first and second locations being specified on the digital raster image;

a measurement calculator that calculates a true scale measurement of the route based at least in part on DPI of the digital raster image, original size of the paper drawing and scale information each of which are embedded in a header of the digital raster image and coordinates of pixels defining the first and second location specified on the digital raster image; and presentation means for displaying the route and true scale measurement.

12. The method of claim 1, wherein the digital raster image is a TIFF image, said scale information being embedded in a header of the TIFF image.

13. The method of claim 7, wherein the digital raster image is a TIFF image, said processor calculates the true scale measurement of the route using the scale information from the header of the TIFF image.

14. The method of claim 11, wherein the digital raster image is a TIFF image, said measurement calculator reads the scale information from the header of the TIFF image.

15. A system for presenting information of a digital raster image, comprising:

a digitizing device that digitizes a paper document to create a digital raster image, wherein DPI of the digital raster image, original size of the paper document and scale information associated with the paper document is recorded and embedded in a header of a TIFF image;

a digital image viewer that receives the digital raster image and:

renders the digital raster image to scale and receives input from a user comprising a start and end point within a structure, said start and end points are not prescribed; and a processor that calculates a true scale measurement of a route from the start point to the end within said structure, said processor calculates the true scale measurement of the route using the DPI, the original size and the scale information embedded in the header of the TIFF image, wherein the route is presented to the user.

* * * * *